United States Patent

Muth et al.

Patent Number: 6,056,140
Date of Patent: May 2, 2000

[54] FILLER NECK CAP ASSEMBLY

[75] Inventors: Manfred Karl Joachim Muth, Plettenberg, Germany; Sandor Palvölgyi, Gleisdorf, Austria

[73] Assignee: Tesma Motoren- und Getriebetechnik Ges.m.b.H, Preding-Krottendorf, Austria

[21] Appl. No.: 09/091,699

[22] PCT Filed: Jan. 9, 1997

[86] PCT No.: PCT/AT97/00001

§ 371 Date: Jun. 23, 1998

§ 102(e) Date: Jun. 23, 1998

[87] PCT Pub. No.: WO97/27122

PCT Pub. Date: Jul. 31, 1997

[30] Foreign Application Priority Data

Jan. 9, 1996 [AT] Austria ......................... 34/96

[51] Int. Cl.⁷ .................................................. B65D 51/16
[52] U.S. Cl. ............................... 220/203.25; 220/203.26; 220/303; 220/304; 220/DIG. 33
[58] Field of Search ........................ 220/203.24, 203.25, 220/203.26, 203.28, 303, 304, DIG. 33

[56] References Cited

U.S. PATENT DOCUMENTS

| | | | |
|---|---|---|---|
| 2,154,113 | 4/1939 | Smith | 220/203.24 |
| 3,809,282 | 5/1974 | Blau et al. | 220/203.24 |
| 3,825,147 | 7/1974 | Noponen et al. | 220/203.24 |
| 3,968,897 | 7/1976 | Rodgers | 220/202.25 |
| 3,974,936 | 8/1976 | Gerdes | 220/203.26 X |
| 4,013,191 | 3/1977 | Gerdes | 220/203.26 X |
| 4,133,346 | 1/1979 | Smith et al. | |
| 5,052,571 | 10/1991 | Susa et al. | 220/203.24 |

FOREIGN PATENT DOCUMENTS

| | | |
|---|---|---|
| 0 064 427 | 11/1982 | European Pat. Off. |
| 30 19 650 | 12/1980 | Germany |
| 38 27 791 A1 | 5/1989 | Germany |

*Primary Examiner*—Stephen K. Cronin
*Attorney, Agent, or Firm*—Frishauf, Holtz, Goodman, Langer & Chick, P.C.

[57] ABSTRACT

A cap assembly (4) for a filler neck, especially of a motor vehicle fuel tank, with a somewhat pot-shaped insert (7) insertable to form a seal for the end of the filler neck (1), having projections (6) at its outer periphery engaging in bayonet or threaded grooves (5) in the filler neck and covered at its upper end projecting from the filler neck by a cap (8), and fitted with an over/underpressure valve (11) which acts via apertures (35, 39) in the base of the insert (7) and in its upper end and/or in the cap (8) between the inside of the filler neck and the atmosphere. The entire insert (7) is pressed from sheet steel and the over/underpressure valve (11) is encapsulated in a valve housing (12) fitted in the insert (7) and having a peripheral flange secured by the folded edge (14) of the insert (7).

16 Claims, 1 Drawing Sheet

FILLER NECK CAP ASSEMBLY

BACKGROUND OF THE INVENTION

1. Field of the Invention

The present invention relates to a filler neck cap assembly, especially of an automotive fuel tank, with an approximately pot-shaped insert sealingly insertable into the filler neck end, which insert is provided with projections for engaging in bayonet or helical slots of the filler neck, at its upper end protruding from the filler neck end is circumferentially embraced by a top cap, and contains a pressure vacuum relief valve, which communicates between the filler neck interior and the atmosphere via apertures in the bottom of the insert on the one hand and in the upper end of the insert and/or in the top cap on the other hand, the pressure vacuum relief valve being encased in a self-contained valve housing, which is enclosed in the insert and equipped with a circumferential flange.

2. Background of the Invention

Such a cap assembly is known from U.S. Pat. No. 4,133,346 which shows a filler neck cap assembly with a pressure vacuum relief valve encased in a sheet-metal housing. The sheet-metal housing of the valve is press-fitted into an insertable plastic closure engaging in the filler neck end. This design has the disadvantage that a separate plastic injection-molding process is necessary for manufacture of the insert, and that the pressure vacuum relief valve, once pressed into the insert, can not be replaced without being destroyed. Modular replacement of the valve to select a specified valve function is not possible.

OBJECTS AND SUMMARY OF THE INVENTION

The object of the invention is to provide a cap assembly which can be fabricated and assembled more simply and more inexpensively. This object is achieved according to the invention by the fact that the insert is formed from sheet metal and the pressure relief has a circumferential flange which is secured by the rebent rim of the insert.

By assembling the pressure vacuum relief valve by simple rebending of the insert made from sheet metal in the manner according to the invention, prefabrication, stocking of modular components, and simple in situ assembly of cap assemblies with different valve functions or standardized valve casings with different external cap assembly forms is achieved. The insert is formed inexpensively from sheet metal and is stiffened by the enclosed pressure vacuum relief valve. As a result the danger of deformation and inadvertent opening of the valve is very slight.

Preferably the rim of the insert is provided with tongues foldable over inwardly, preferably made from a welded-on ring, for securing the circumferential flange of the valve housing, thus making it a very simple matter to fix the valve housing.

According to a further preferred feature of the invention, a collar depending downwardly from the circumference of the bottom of the insert is formed from a fold of the wall material of the insert, and at two places at least distributed over the circumference is forced radially outward to obtain thereat the respective projections by taking advantage of the yielding behavior of the wall material. This integrated type of fabrication of the projections represents a decisive cost benefit.

In a particularly favorable embodiment, the rim of the insert is prolonged at the connection to its rebending section securing the circumferential flange of the valve housing and is outwardly folded over at an obtuse angle, preferably 160°, the top cap being snapped onto the cuff by means of snap-in locking projections. The cuff thus forms a sliding surface, which deflects the top cap away from the insert under the effect of a radial force, thus further increasing crash safety.

In each case, it is advantageous for the insert to be equipped at its upper end with radial notches for engagement with internals ribs of the top cap. This represents a simple and effective way of transferring the torque necessary for operation of the cap assembly from the top cap to the insert.

BRIEF DESCRIPTION OF THE DRAWINGS

The invention will be explained in more detail hereinafter by means of an example illustrated in the attached drawing. The single FIGURE of the drawing shows the cap assembly according to the invention in combination with a filler neck, a section of which is illustrated, the left and right halves of the FIGURE showing axial section halves disposed at right angles to each other.

DETAILED DESCRIPTION

Figure 1:
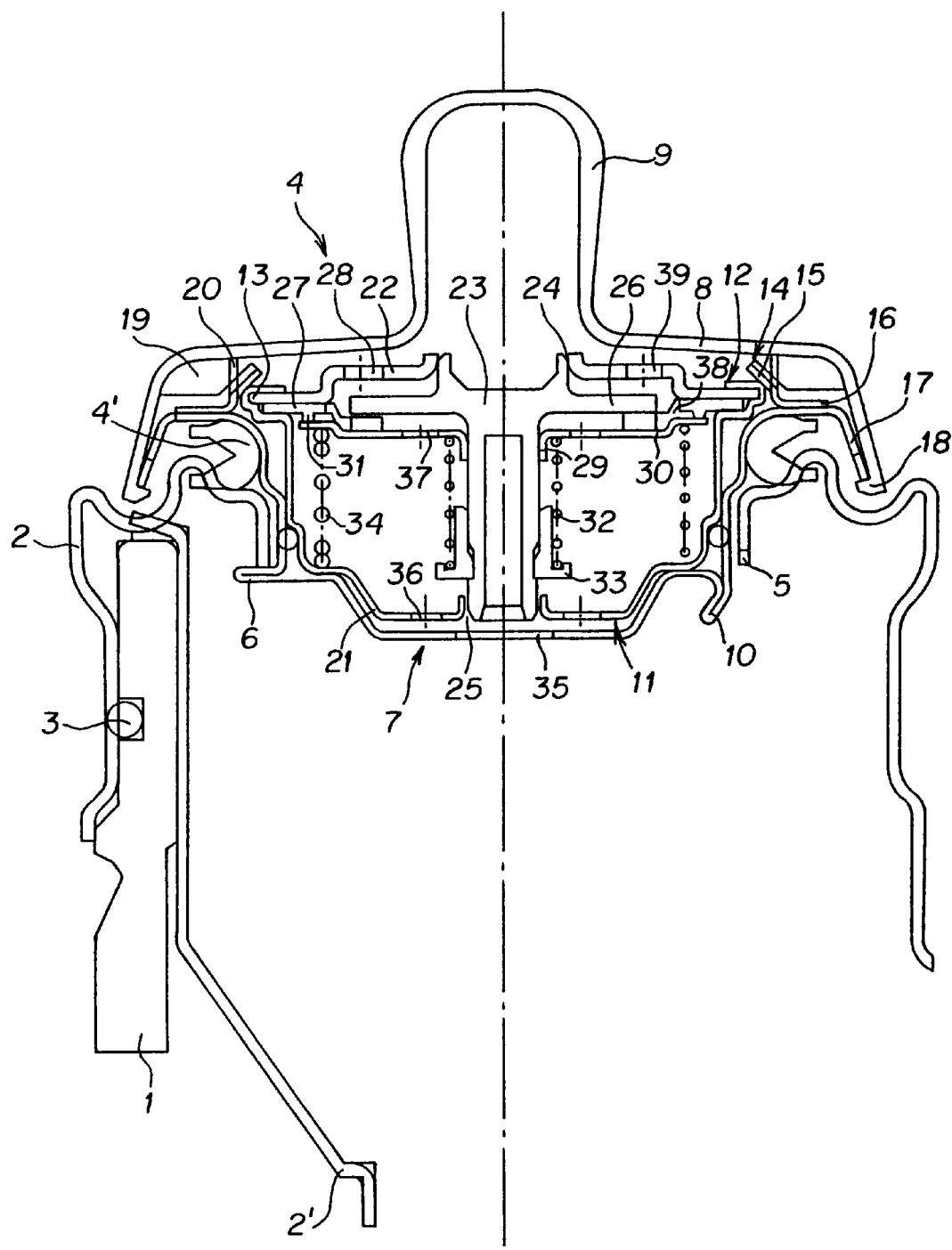

In the FIGURE there is shown the upper end 1 of a filler neck (not further illustrated), which leads to an automotive fuel tank. Onto the filler neck end 1 there is slipped a metal ring 2, an O-ring 3 being interposed therebetween. The metal ring 2 is used to anchor a cap assembly denoted as a whole by 4 and for this purpose is provided at its inside circumference with bayonet or helical slots 5 for engagement of corresponding projections 6 (to be described in detail hereinafter) of the cap assembly 4. Between the cap assembly 4 and the metal ring 2 there is provided an annular profiled sealing element 4'. Between the metal ring 2 and the end face of the filler neck end 1 there is defined a guide funnel 2' to guide a fuel nozzle (not illustrated) for refueling.

Instead of the use of a metal ring for anchoring the cap assembly 4, the filler neck end 1 could also be constructed with corresponding bayonet or helical slots 5.

The cap assembly 4 comprises substantially a pot-shaped insert 7 formed from sheet metal, which carries the projections 6 and a top cap 8, formed from plastic, pushed onto the upper end of the insert 7 protruding from the filler neck end 1. The top cap 8 is equipped with a central hand grip 9.

The projections 6 are obtained by simple deformation of the wall material of the insert 7. For this purpose, there is formed from a fold of the wall material a collar 10 depending downwardly from the circumference of the bottom of the insert 7 as well as—by taking advantage of the yielding behavior of the wall material—a radially outwardly forced projection 6 at each of at least two places distributed over the circumference. In this regard it is immaterial whether the projections 6 and then the collar 10 are produced by folding over or vice versa or whether both elements are produced in a single deformation step.

In insert 7 there is contained a pressure vacuum relief valve denoted as a whole by 11. The pressure vacuum relief valve 11 is completely enclosed in a cylindrical valve housing 12, which is provided at its upper end with a circumferential flange 13, with which it is secured in the rebent rim 14 of the insert 7. Rebending of the rim 14 around the circumferential flange 13 can be achieved, for example, by beading or, as in the illustrated case, by inward bending of tongues 15, which are formed in a welded-on ring 16. Alternatively, the tongues 15 can also be formed integrally with the rest of insert 7.

At the connection to the rebending region securing the circumferential flange 13, the rim 14 is prolonged and folded back outwardly at an obtuse angle of approximately 160° relative to the axial direction, thus producing a cuff 17 in the form of a truncated cone, onto which the top cap 8 can be snapped by means of inwardly directed snap-in locking projections 18. The oblique outside circumferential face of the cuff 17 favors lifting of the top cap 8 from the insert 7 if a radial force is exerted on the top cap 8 in the event of a crash.

The top cap 8 is equipped with radial internal ribs 19, which engage in radial notches 20 in the ring 16 and transmit a torque applied on the top cap to the insert 7, in order to attach it to or detach it from the filler neck. Alternatively, the top cap 8 could be equipped with radial notches and the ring 16 with radial ribs, e.g., for simpler fabrication of the top cap by injection molding.

The valve housing 12 of the pressure vacuum relief valve 11 comprises a substantially pot-shaped container part 21 of formed sheet metal combined with a cover part 22 of rigid material, such as a metal plate with a thickness of 3 mm. The circumferential rim of the cover part 22 is embraced by the rebent upper rim of the container part 21 and forms together therewith the circumferential flange 13 of the valve housing 12.

A valve spindle 23 is mounted axially movably in the valve housing 12. The valve spindle 23 passes through a central aperture 24 in the cover part 22 and a central aperture 25 in the bottom of the container part 21 and is guided axially by these two apertures.

The valve spindle 23 carries a first valve disk 26 (integrally formed thereon), which cooperates with an annular sealing element 27 in a first annular region 28. The annular sealing element 27 is secured between the cover part 22 and the container part 21. On the valve spindle 23 there is also guided axially movably a collar 29, which carries a second valve disk 30, which cooperates with the annular sealing element 27 in a second annular region 31.

The first valve disk 26 is biased toward the annular sealing element 27 via a compression spring 32, which acts between a shoulder ring 33 fixed axially on the valve spindle 23 and the second valve disk 30. The second valve disk 30 is also biased toward the annular sealing element 27 by means of a compression spring 34, which is braced against the bottom of the container part 21.

Flow apertures 35 to 39, which are cut out of the insert 7, the container part 21, the second valve disk 30, the annular sealing element 27, the cover part 22 and the rim 16, provide either a flow path via the valve gap between the first valve disk 26 and annular sealing element 27 if pressure builds up in the interior of the filler neck 1, or a flow path via the valve gap between the second valve disk 30 and annular sealing element 27 if vacuum is produced in the interior of the filler neck 1. The functional principle of such a pressure vacuum relief valve is known in the art.

The invention is obviously not limited to the illustrated embodiment. For example, the pressure vacuum relief valve may have any known design or function and, for example, the valve disks can even fit concentrically on one side of the annular sealing element. Furthermore, the exact form of the insert 7, its projections 6 and its rim is optional, provided it can be fabricated merely from inexpensive sheet metal and stiffened adequately by the enclosed, encased valve.

We claim:

1. A filler neck cap assembly comprising:
    an insert sealingly insertable into a filler neck of a fuel tank, the insert having an enclosed bottom and sides, and with its top having an opening therein surrounded by a rim;
    a top cap coupled to the top of the insert, the top cap and insert defining a space therebetween; and
    a self-contained valve housing enclosing a pressure vacuum relief valve, the self-contained valve housing being accommodated in said space and having a circumferential flange;
    said rim being bendable between a first position in engagement with said circumferential flange to secure said self-contained valve housing to the insert, and a second position in disengagement from said circumferential flange to release said self-contained valve housing from said insert for removal thereof from said space.

2. A filler neck cap assembly according to claim 1 further including first apertures in the insert and second apertures in at least one of the insert and the top cap, and wherein the pressure vacuum relief valve communicates via the first and second apertures with both an interior of the filler neck and the atmosphere.

3. A filler neck cap assembly according to claim 1, wherein the rim includes tongues which are inwardly foldable to engage the circumferential flange.

4. A filler neck cap assembly according to claim 3 wherein the tongues are made from a welded-on ring.

5. A filler neck cap assembly according to claim 1, wherein the insert includes a collar extending downwardly from a circumference of the bottom thereof, the collar extending radially outward at least at two places on the circumference of the bottom of the insert to define projections.

6. The filler neck cap assembly of claim 5, wherein the collar is formed from a fold of material constituting the walls of said insert.

7. A filler neck cap assembly according to claim 1, wherein the insert includes a rebending region proximate said rim at which the rim extends radially outward and is folded over to define a cuff, the top cap including snap-in locking projections for attachment to the cuff.

8. A filler neck cap assembly according to claim 7, wherein the rim is outwardly folded over at an angle of 160°.

9. A filler neck cap assembly according to claim 1, wherein the upper end of the insert includes radial notches for engagement with internal ribs of the top cap.

10. A filler neck cap assembly according to claim 1, wherein the insert is made of sheet metal.

11. A filler neck cap assembly according to claim 1, wherein the self-contained valve housing comprises an open-ended container made of sheet metal and a disk-shaped cover having a circumferential edge engaging walls at the open end of the container so as to form the circumferential flange.

12. A filler neck cap assembly comprising:
    an insert sealingly insertable into a filler neck of a fuel tank, the insert having an enclosed bottom and sides, and with its top having an opening therein surrounded by a rim;
    a top cap coupled to the top of the insert, the top cap and insert defining a space therebetween; and
    a self-contained valve housing enclosing a pressure vacuum relief valve, the self-contained valve housing being accommodated in said space and having a circumferential flange;
    wherein the circumferential flange is releasably engagable with the rim such that the self-contained valve housing, once secured to the insert, is releasable and the pressure vacuum relief valve is removable from the valve housing and replaceable, and wherein after replacement of the pressure vacuum relief valve, the self-contained valve housing is re-secured to the insert with the circumferential flange being releasably engagable with the rim.

13. A filler neck cap assembly comprising:

an insert sealingly insertable into a filler neck of a fuel tank, the insert having an enclosed bottom and sides, and with its top having an opening therein surrounded by a rim;

a top cap coupled to the top end of the insert, the top cap and insert defining a space therebetween; and a self-contained valve housing for enclosing a pressure vacuum relief valve, the self-contained valve housing being accommodated in said space and having a circumferential flange, the pressure vacuum relief valve including an elongated valve body mounted to be axially movable within and guided by the valve housing.

14. The filler neck cap assembly of claim 13, wherein said elongated valve body is guided at one end by an opening in a bottom of said valve housing and guided at an opposite end by an opening in a top of said valve housing.

15. A filler neck cap assembly comprising:

an insert sealingly insertable into a filler neck of a fuel tank, the insert having an enclosed bottom and sides, and with its top having an opening therein surrounded by a rim;

a top cap coupled to the top end of the insert, the top cap and insert defining a space therebetween; and a self-contained valve housing for enclosing a pressure vacuum relief valve, the self-contained valve housing being accommodated in said space and having a circumferential flange, the pressure vacuum relief valve being a single valve including a planar surface which is movably mounted proximate an opening in said self-contained housing, the planar surface of said pressure vacuum relief valve constituting at least part of a valve closure for said opening, and being movably reactive both to a high pressure in an interior of the filler neck relative to the atmosphere and a low pressure in the interior of the filler neck relative to the atmosphere.

16. The filler neck cap assembly of claim 15, wherein a cross-section of said insert is substantially U-shaped, with said planar surface of the pressure vacuum relief valve having a size substantially corresponding to said opening.

* * * * *